(12) United States Patent
Grasselli

(10) Patent No.: US 10,051,870 B2
(45) Date of Patent: Aug. 21, 2018

(54) SAFETY SYSTEM

(71) Applicant: GRASSELLI S.P.A., Albinea (IT)

(72) Inventor: Giorgio Grasselli, Albinea (IT)

(73) Assignee: GRASSELLI S.P.A., Albinea (IT)

( * ) Notice: Subject to any disclaimer, the term of this patent is extended or adjusted under 35 U.S.C. 154(b) by 0 days.

(21) Appl. No.: 15/363,544

(22) Filed: Nov. 29, 2016

(65) Prior Publication Data

US 2018/0098550 A1   Apr. 12, 2018

(30) Foreign Application Priority Data

Oct. 11, 2016   (IT) .......................... 102016000101951

(51) Int. Cl.
 *A22B 5/00* (2006.01)
 *A22B 5/16* (2006.01)

(52) U.S. Cl.
 CPC .................................... *A22B 5/166* (2013.01)

(58) Field of Classification Search
 CPC ................................. A22B 5/00; A22B 5/166
 USPC .................................................. 452/125–127
 See application file for complete search history.

(56) References Cited

U.S. PATENT DOCUMENTS

| | | | |
|---|---|---|---|
| 4,965,909 A * | 10/1990 | McCullough | F16P 3/12 192/131 R |
| 4,996,742 A * | 3/1991 | Townsend | A22B 5/166 452/125 |
| 5,025,175 A | 6/1991 | Dubois, III | |
| 5,083,973 A * | 1/1992 | Townsend | A22C 17/12 192/131 R |
| 5,157,379 A | 10/1992 | Dennison | |
| 5,160,289 A | 11/1992 | DuBois, III | |
| 5,201,684 A * | 4/1993 | DeBois, III | F16P 3/12 307/326 |
| 5,569,071 A * | 10/1996 | Metier | A22C 21/0092 452/185 |

(Continued)

FOREIGN PATENT DOCUMENTS

| | | |
|---|---|---|
| DE | 102008005986 A1 | 7/2009 |
| EP | 0445860 A2 | 9/1991 |

(Continued)

*Primary Examiner* — Richard T Price, Jr.
(74) *Attorney, Agent, or Firm* — Pearne & Gordon LLP

(57) ABSTRACT

The safety system (1) for a machine equipped with a moving organ (21) comprises: a first processing unit (4) associated with the moving organ (21), configured to receive signals and comprising a command module (41) configured to alter the operation of the organ (21) itself, upon receiving an alarm signal; gloves (5) that can be worn by an operator (3); and a second processing unit (6), associated with gloves (5) and configured to transmit signals to the first unit.

Each glove (5) comprises an element (51) for conducting signals, connected to the second unit (6) and crossing at least a portion of the palm and/or fingers and/or the edge zone opposite the thumb.

The system (1) comprises a device for generating a safety signal connected to the conducting element (51) and the second processing unit (6) comprises a first control module (63) configured to detect an interruption of the transmission of the safety signal.

The second processing unit (6) comprises an alarm module (64), subjected to the first control module (63) and able to generate an alarm signal, upon verifying the interruption of the safety signal.

12 Claims, 6 Drawing Sheets

(56) References Cited

U.S. PATENT DOCUMENTS 5,669,809 A * 9/1997 Townsend .............. A22C 17/12
307/326

FOREIGN PATENT DOCUMENTS

| EP | 1353111 | A2 | 10/2003 |
|----|---------|----|---------|
| EP | 2696125 | A1 | 12/2014 |
| WO | 2015140770 | A2 | 9/2015 |

* cited by examiner

SAFETY SYSTEM

The present invention relates to a safety system for work machines provided for protecting operators.

In particular, the system can be applied to any type of machinery that has at least one moving organ with which an operator can come into contact accidentally.

In particular, the machine according to the invention is especially designed to protect the upper limbs of the operators, particularly in relation to their hands.

Even more in particular, the system may be devised above all, but not exclusively, for its application to skinners. A skinner, or membrane removing machine, is a machine used in the meat industry to separate the rind from the flesh of a portion of meat.

A known skinner comprises a frame that supports a plane on which the portion of meat to be skinned is placed.

The machine is equipped with a toothed roller, put in rotation by a motor, which drags the portion of meat, manually retained by the operator, to subject it to the action of a blade, in order to remove its rind.

In practice, the operator manually moves the portion of meat towards the roller and, therefore, when using these machines, the risk of accidental contact between the operator's hand and the roller itself is intrinsic.

For these reasons, skinners may be equipped with electronic safety systems.

In particular, a safety system is known which comprises an electronic unit associated with the operator and a central processing unit associated with the operating machine, able to receive signals from the unit associated with the operator.

The unit associated with the operator is connected to gloves entirely made of a conductive material, envisaged to be worn by an operator.

The central unit is configured to block the machine if the glove comes into contact with the roll or the blade, in turn made of conductive material.

In practice, if the glove and the roller or the blade touch each other, an electric circuit is closed which generates an alarm signal which, once processed by the unit on board the machine, stops the rotation of the roller.

However, such a system has been shown to be only partially effective.

The drawbacks encountered in the known system include in particular the fact that it does not provide the certainty that the skinner is only and exclusively activated if the operator is actually wearing both gloves.

The technical task underlying the present invention is therefore to propose an electronic safety system that is more effective than the known systems mentioned above.

The technical task is reached by the safety system provided in accordance with claim 1.

Further characteristics and advantages of the present invention will become more apparent from the following indicative, and hence non-limiting, description of a preferred, but not exclusive, embodiment of the proposed system as illustrated in the appended drawings, in which.

Figure 5:
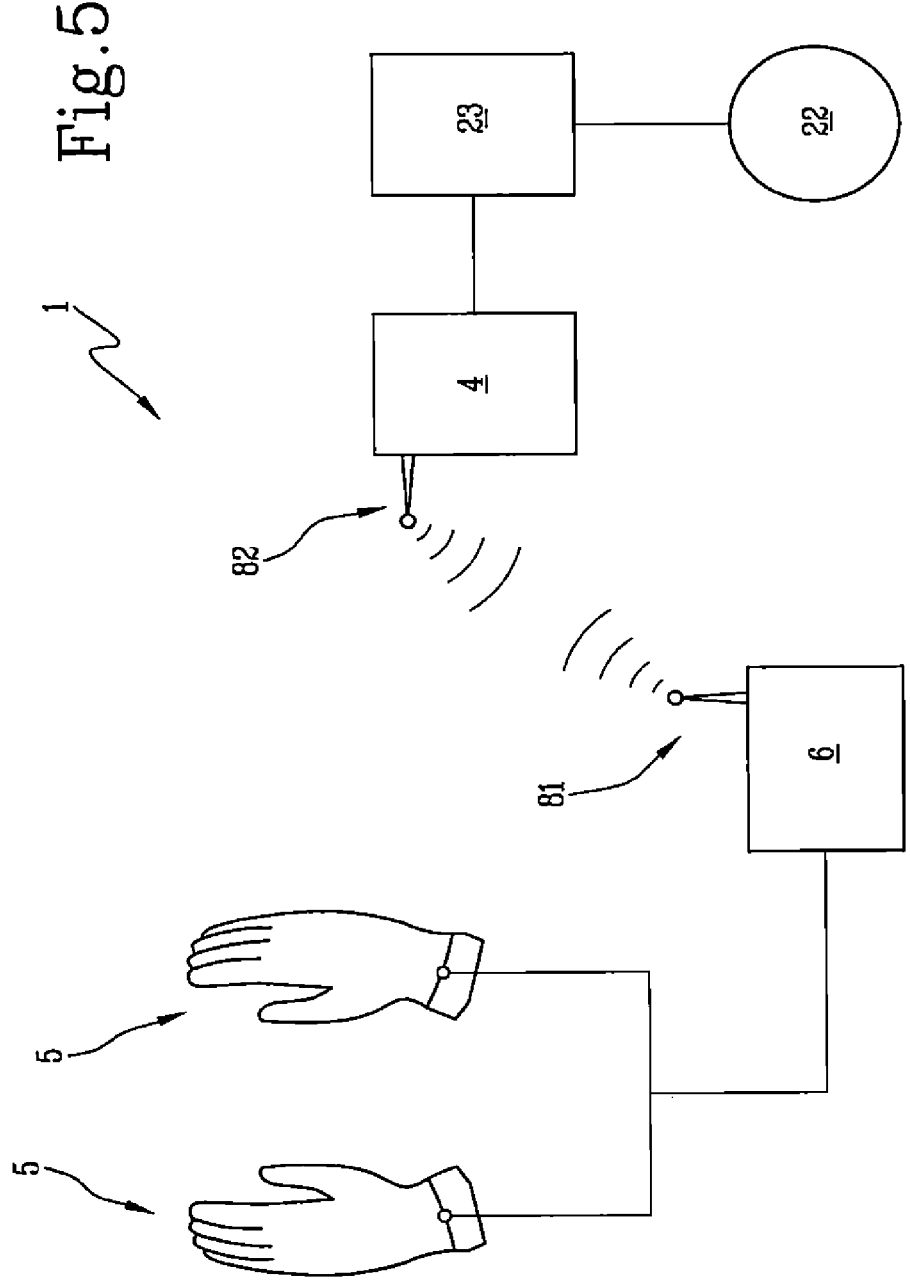
FIG. 5 is a diagram that represents the proposed system.

With reference to FIG. 5, 1 indicates a safety system according to the invention.

The proposed system 1 has been devised for use with an industrial machine 2 equipped with a moving organ 21, especially a machine for processing meat or fish on an industrial scale.

In detail, the invention has been designed for use with a skinner 2, of the type described in the discussion of the known art.

For the purpose of simplifying the disclosure and without losing any general details, reference shall be made below to the particular case in which the machine is a skinner 2; therefore, the mentioned moving organ comprises the toothed roller 21, mentioned above.

The proposed system 1 is designed to protect the safety of operators 3 working with the machine 21, with particular reference to the integrity of their hands.

The invention includes a first processing unit 4 associated with the toothed roller 21 and configured to receive signals.

Such first processing unit 4 includes a command module 41 configured to modify the operation of the roller 21, upon receiving an alarm signal.

More precisely, upon the alarm signal, the command module 41 can establish the stopping of the roller 21 or the inversion of its rotation direction.

Figure 4:
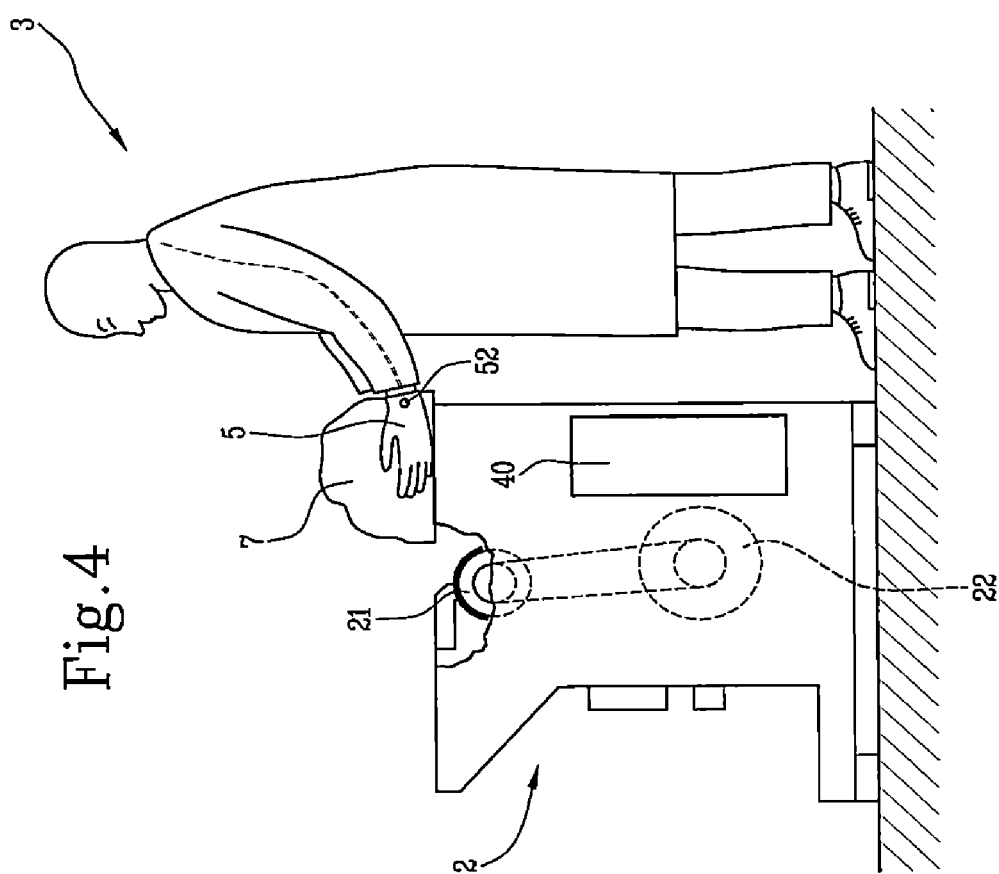
FIG. 4 is a schematic lateral view of an operator wearing a work uniform on top of the sling according to the previous figure and using a skinner.

In further detail, the roller 21 can be activated by a motor 22 (shown in FIGS. 4 and 5) provided with a command logic configured to receive a stopping or inversion signal produced by the command module 41.

The command logic may comprise a control board that commands the remote control switches 23 activating the motor 22 based on signals for stopping or inverting the motion produced by the command module 41 of the first processing unit 4.

Furthermore, the invention includes gloves 5 that can be worn by an operator 3 during the operations for separating the rind, through the use of the skinner 2.

In detail, the operator 3 has available at least one pair of gloves 5, right and left, which constitute components to allow the invention to detect a condition of serious danger to the integrity of the hands.

Preferably, a multitude of gloves 5 is made available, provided in accordance with the invention, to allow their replacement, when they are worn or damaged.

The proposed system 1 also includes a second processing unit 6, operatively associated with gloves 5 and configured to transmit signals to the first processing unit 4.

Preferably, the second unit 6 is comprised in a second functional group which is worn by the operator 3, while the first unit 4 can be included in a first functional group 40, distinct from the second one and contained or integrated into the machine 2.

In practice, a first "fixed" functional group 40 may be provided for each machine 2 or there may also be a single central unit that remotely handles a plurality of skinners.

The principle does not exclude the fact that the first and the second functional units 40 are contained in the same device or that they are even integrated or coinciding with each other.

It should be noted that the processing units 4, 6 are presented hereunder as divided into distinct functional modules for the purpose of describing the functions thereof in a clear and complete manner.

In practice, each processing unit may 4, 6 consist of a single electronic device, duly programmed to perform the functions described, and the various modules may correspond to hardware and/or routine software entities belonging to the programmed device.

Alternatively, or in addition, such functions may be performed by a plurality of electronic devices over which the aforesaid functional modules can be distributed.

In a preferred embodiment of the invention, the first and second processing unit 4, 6 each include a respective microcontroller.

Figure 2:
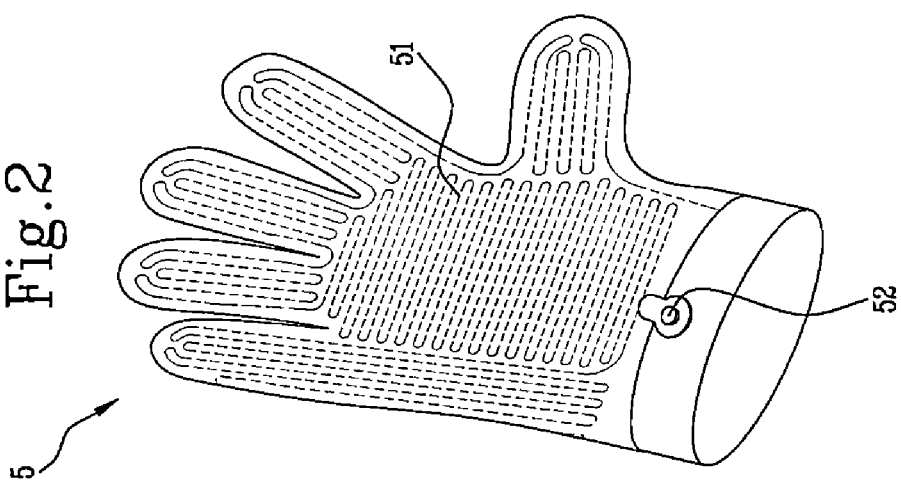
FIG. 2 is a schematic axonometric view of a glove according to the invention.
Figure 1:
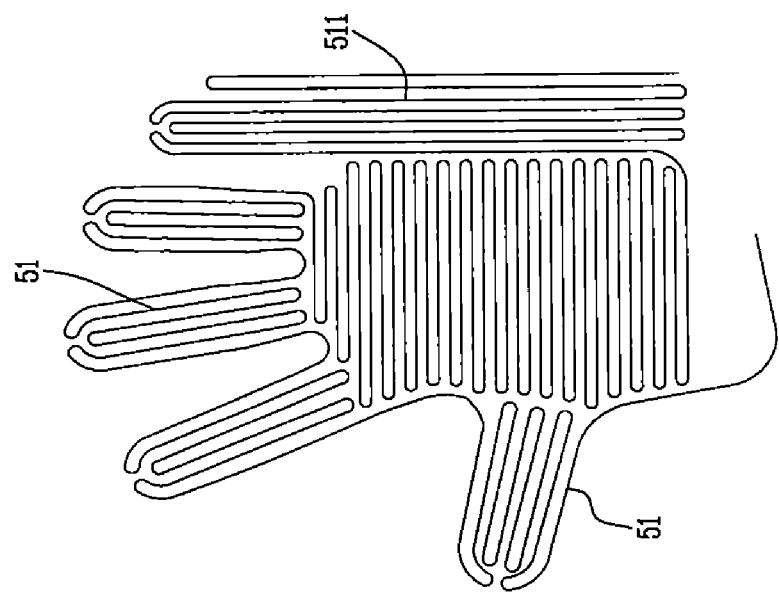
FIG. 1 is a representation, projected onto a plane, of the path of a safety wire applied to a glove according to the invention.

According to an important aspect of the invention, shown in FIGS. 1 and 2, each glove 5 comprises an element 51 for conducting signals, connected to the second unit 6 and through at least one portion of the palm and/or the fingers and/or the edge of the hand.

In describing the different zones of the glove 5, the names of the anatomical parts of the hand covered by the zones themselves are used.

Preferably, each glove 5 includes a single conducting element 51 which travels along the palm, the volar part of the fingers, including the "tips" (the parts that cover the fingertips) and the "edge" zone of the hand, opposite the thumb, including the external side of the little finger.

In other words, as shown in FIGS. 1 and 2, the conducting element 51 substantially affects the whole of the front zone of the glove 5, i.e. the one opposite the back, plus the lateral portion opposite the thumb.

An embodiment is not excluded wherein the back of the glove 5 is also affected by the conducting element 51.

The conducting element 51 is preferably located at the surface of the glove 5, but versions are also possible in which it is internal or incorporated into the fabric or material with which the glove 5 itself is made.

The conducting element 51 may be wire-shaped and be sewn into the glove 5 itself.

As shown in FIGS. 1 and 2, the conducting element 51 may define a path formed by rectilinear portions and curved portions, configured so that two contiguous portions are less than 10 mm away from each other and preferably less than 7 mm and, even more preferably about 5 mm away from each other; versions are not excluded in which two contiguous portions are less than 5 mm or 4 mm away from each other.

Even more in detail, the path, or circuit, described by the conducting element 51 is preferably composed of groups formed by a plurality of rectilinear portions connected by curved portions.

In the example shown, five groups of the type described in the previous paragraph can be found, arranged in a succession along the path, and corresponding to: thumb, index finger, middle finger, ring finger, palm and little finger, together with the edge side of the hand.

The conducting element 51 may be wire-shaped, and may be an electric wire, therefore adapted to transmit an electric safety signal, or an optical fibre, adapted to transmit an optical safety signal.

It is to be noted that the invention also includes a device for generating a safety signal connected to the conducting element 51.

Below, reference will be made to the non-limiting example, in which the conducting element 51 is an electric wire which, for the purpose of simplicity, will be called the safety wire.

The safety wire 51 may comprise a steel core coated in a teflon sheath and may be sewn onto the surface of the glove 5 with a sealing wire made of polyester or a synthetic material; applications are not excluded in which the sealing wire is made of natural material.

The sheath of the safety wire 51 may be made of material other than teflon, however teflon is preferable as it allows protection from the acidic substances with which the safety wire 51 comes into contact while processing the meat, and also from ultraviolet rays.

The glove 5 intended to cover the hand and to support the safety wire 51, is preferably made of cotton, so as to be easily tearable; in this way, in case of contact with the teeth of the roller 21 or with the edge of the blade, it is less likely for the glove 5 to get stuck and drag the hand against the roller 21 and the blade themselves.

Special connection points may be provided, for example two conducting studs 52 located in opposite points of the glove 5, to which respective opposite ends of the safety wire 51 are electrically connected.

In this case, the device for generating the safety signal is placed in connection with the studs 52 through special terminals, so as to allow the closure of the circuit.

Figure 3:
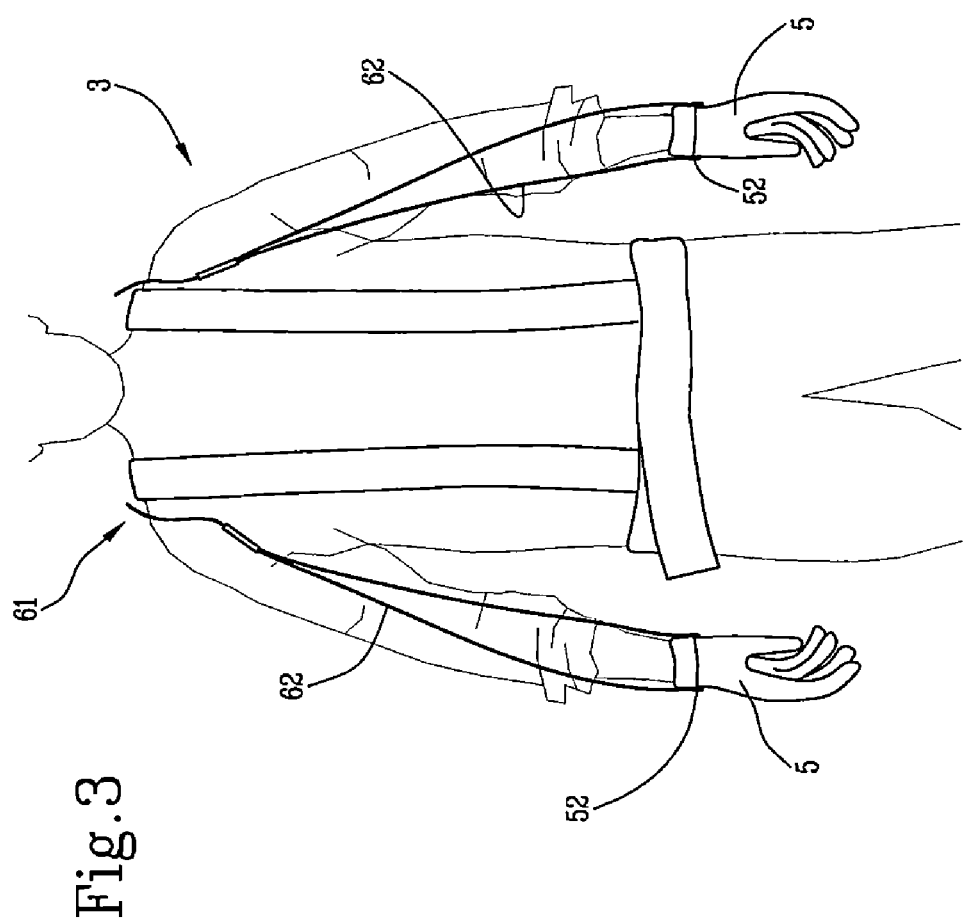
FIG. 3 is a schematic front view of a sling according to the invention, worn by an operator.

As shown in FIG. 3, a sort of sling 61 may be provided to be worn by the operator 3, configured like a pouch, which carries fixed, or however integral, the aforementioned second functional group, from which pairs of cables 62 extend which end in respective terminals for connection with the studs 52.

In this case, the second functional group comprises the second processing unit 6 and the signal generating device, connected to one another and, for example, closed in a sealed way into the same casing.

The second processing unit 6 comprises a first control module 63 configured to detect an interruption in the transmission of the safety signal along the safety wire 51 (or other conducting element) of at least one glove 5.

In detail, the invention may envisage a device for measuring the impedance of the signal that crosses the safety wire 51 connected to the second processing unit 6; such measurement device is preferably included in the second aforementioned functional group.

In this case, the first control module 63 is configured to determine the interruption of the transmission of the signal following a measurement of the impedance value that reaches or exceeds an interruption threshold.

In particular, it is considered that the signal has been interrupted if the impedance measured in the safety wire 52 has an infinite value.

In practice if, during the skinning operations of a portion of meat 7, one of the gloves 5 worn comes into contact with the roller 21, or even with the blade, and a cut or damage is caused to the safety wire 51, this is detected and processed by the second processing unit 6.

The system 1 according to the invention also envisages the second processing unit 6 comprising an alarm module 64, subjected to the first control module 63 and able to generate an alarm signal, upon verifying the aforementioned interruption of the safety signal.

The alarm signal is transmitted to the first processing unit 4 which then stops or inverts the motion of the roller 21, according to the methods described above.

Given that, as shown in FIGS. 1 and 2, the path of the safety wire 51 defines a particularly dense pattern at the zones of the glove 5 (and the hand) which are statistically more susceptible to being affected by contact with the roller 21, it is clear that the invention allows possible accidents of operators to be strongly reduced, with a minimum or zero risk of false positives or negatives.

The invention preferably comprises wireless telecommunication means 81, 82 which connect the first and the second functional group.

For example, the second portable functional group may comprise a radio frequency transmitting device 81, connected to the second unit 6, able to transmit radio signals, in particular the mentioned alarm signal, to a receiver 82 connected to the first unit 4 and contained in the first functional group 40 (see the diagram in FIG. 5).

In general, the most varied wireless telecommunication means can be used.

In practice, each skinner 2 present in an industrial system for treating meat, may be provided with its own first functional group 40, to which the motor 22 of the toothed roller 21 is subjected, while each operator 3 can be equipped with the aforementioned sling 61 that carries the second functional group, able to detect and process the safety signals that run through the gloves 5.

Therefore, the operator 3 is free to move comfortably, without any obstacles to the correct work manoeuvres and can move quickly away from the machine, in case of danger, without any constraints due to cables or other similar physical connections and also without the risk of electrocution inherent in a wire connection with the machine.

Figure 6:
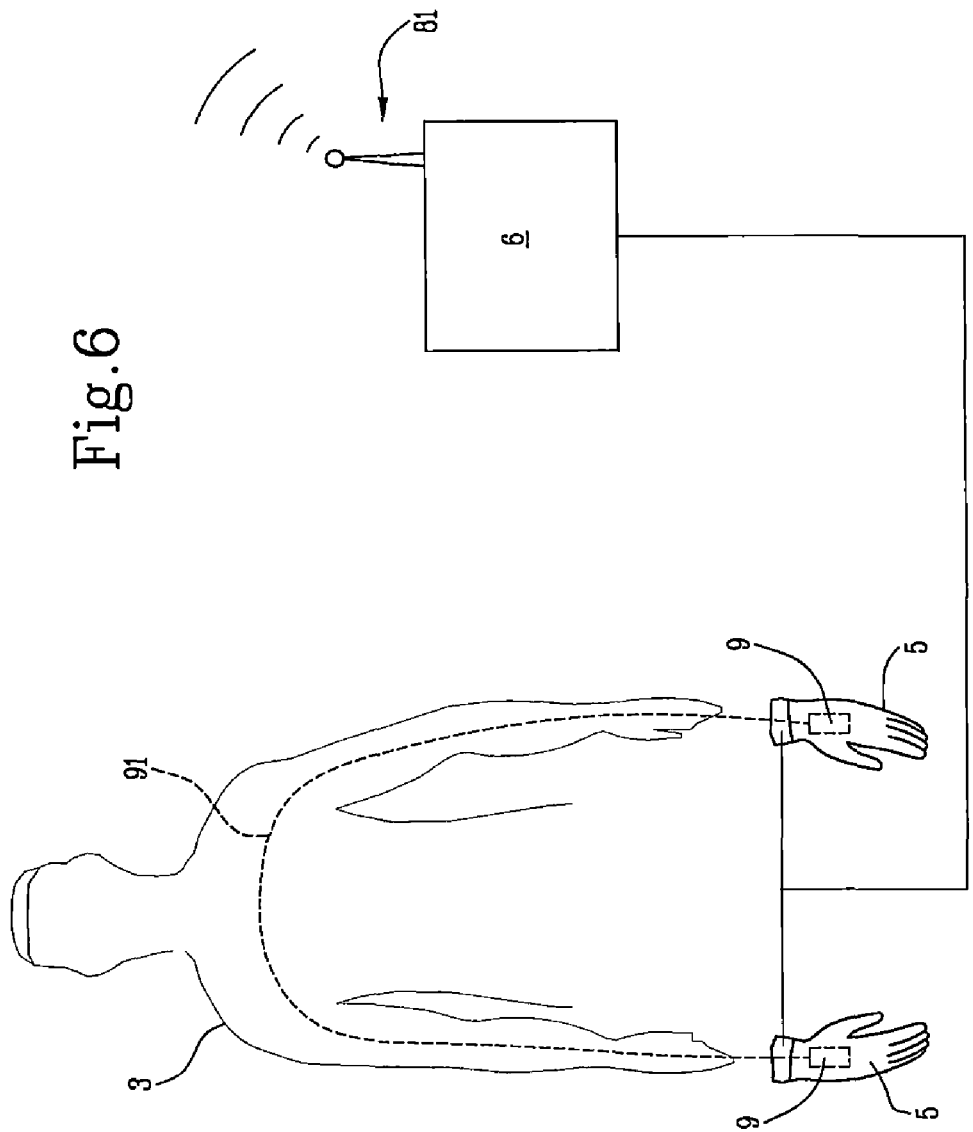
FIG. 6 is a diagram that represents some aspects of a particular embodiment of the invention.
Figure 7:
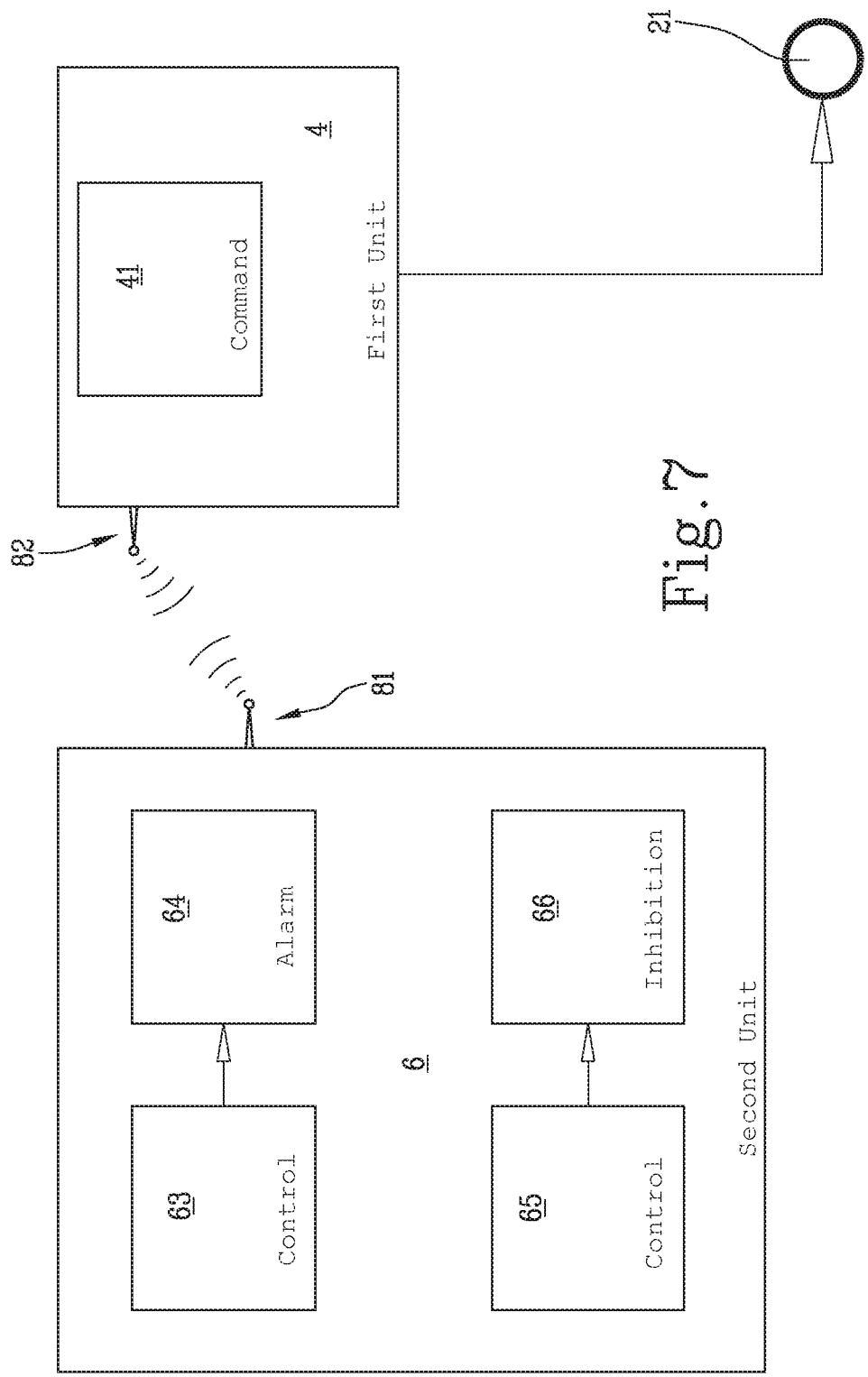
FIG. 7 is a diagram that represents the first and the second electronic processing unit according to the invention.

Below, with the aid of FIG. 6, a preferred embodiment of the invention is described, which envisages steps to guarantee that the operator 3 uses the protection aids offered by the proposed system 1.

Each glove 5 may comprise electrical means 9 for contact with the hand of the operator 3, defining in the operator 3 himself an electrical circuit 91 between the two gloves 5 worn in the right and left hands.

Furthermore, the second processing unit 6 comprises a second control module 65 configured to check whether between the two contact means 9 of the gloves 5, an open or a short circuit is defined.

The second control module 65 may be configured to perform a periodic verification on such a circuit 91, for example with a period of less than 5 seconds and preferably equal to about 2 seconds.

In this case, the second unit 6 comprises an inhibition module 66, subjected to the second control module 65 and configured to generate an inhibition signal when between the contact means 9 an open circuit or a short circuit is defined.

In practice, within each glove 5 and, in use, in contact with the skin of an operator 3, an element is located made of conductive material 9 connected to the second processing unit 6, for example through the studs 52 and the cables 62 mentioned above.

When the two conducting elements 9 of different gloves 5 are in contact with the skin of the hands or wrists of the operator 3, a circuit 91 can be closed that transports a current that can be produced by the device that generates a safety signal or by another dedicated device.

Furthermore, the second processing unit 6 may determine whether the circuit 91 that passes through the operator 3 is open or short using the measurement device used for the verification of the integrity of the safety wire 51 or another device for measuring the impedance, still comprised in the second functional group.

In this embodiment, the command module 41 of the first processing unit 4 is configured to inhibit the activation of the toothed roller 21, upon receiving an inhibition signal.

Preferably, the command module 41 inhibits the action of the roller 21, preventing the activation of the motor 22, according to the methods already explained above, as long as it continues to receive the inhibition signal.

In practice, if the operator 3 is not wearing one or both gloves 5, the second processing unit 6 will detect an open circuit between the contact means 9 and will prevent the action of the roller 21.

If the operator 3 places in contact the two elements 9 made of conductive material, present within the gloves 5, with the intention of "tricking" the system 1, then the second processing unit 6 would detect a short circuit and would, again, inhibit the action of the roller 21.

It therefore happens that the system 1 proposed obliges the operator 3 to wear the gloves 5 using them correctly, reducing to a minimum the number and size of accidents and at the same time reduce the costs for compensation and disputes that the industries in the meat sector currently have to sustain.

The invention is also configured as an equipment for safely processing meat, which comprises a skinner 2 with which the safety system 1 described above is associated.

The invention claimed is:

1. A safety system (1) for a machine equipped with a moving organ (21), comprising:
a first processing unit (4) configured to receive signals and comprising a command module (41) configured to alter the operation of said organ (21) of the machine, upon receiving an alarm signal;
gloves (5); and
a second processing unit (6), associated with said gloves (5) and configured to transmit signals to said first processing unit (4);
characterised in that each glove (5) comprises an element (51) for conducting signals, connected to said second unit (6) and crossing at least a portion of a palm and/or fingers and/or an edge zone of the glove opposite a thumb;
wherein the system (1) comprises a device for generating a safety signal connected to said conducting element (51);
wherein said second processing unit (6) comprises a first control module (63) configured to detect an interruption in a transmission of said safety signal;
the second processing unit (6) comprising an alarm module (64), subjected to said first control module (63) and able to generate an alarm signal, upon verifying said interruption of the transmission of the safety signal.

2. The safety system (1) according to claim 1, wherein the conducting element (51) is located at the surface of the glove (5).

3. The system (1) according to claim 1, wherein a single conducting element (51) crosses the palm, the volar part of the fingers and the edge zone of the glove opposite the thumb of each glove (5).

4. The system (1) according to claim 1, wherein the conducting element (51) is wire-shaped.

5. The system (1) according to claim 1, wherein the conducting element (51) is electrically conductive and is able to transmit an electric safety signal.

6. The system (1) according to claim 1, wherein the conducting element (51) is able to transmit an optical safety signal.

7. The system (1) according to claim 1, wherein each glove (5) comprises electrical contact means (9), in contact with a hand of an operator (3), defining within the operator (3) an electrical circuit (91) between two gloves (5) worn by the operator.

8. The system (1) according to claim 7, wherein the processing unit (6) comprises a second control module (65) configured to verify whether between said contact means (9) an open circuit or a short circuit is defined and further comprises an inhibition module (66), subjected to said second control module (65) and configured to generate an inhibition signal when between the contact means (9) an open circuit or a short circuit is defined.

9. The system (1) according to claim 8, wherein the command module (41) is configured to inhibit the action of said organ (21), upon receiving an inhibition signal.

10. The system (1) according to claim 1, comprising a first functional group (40), comprising the first processing unit (4) and connected directly to the machine (2) and a second portable functional group, which includes the second processing unit (6) and said safety signal generation device.

11. The system (1) according to claim 10 comprising wireless telecommunication means (81, 82) which connect the first and the second functional group.

12. An apparatus for processing meat safely, comprising a skinner machine (2) equipped with a toothed roller (21) and comprising a system (1) according to claim 1, wherein the activation of said roller (21) is subjected to the command module (41) of the first processing unit (4).

* * * * *